United States Patent
Nakamura et al.

(10) Patent No.: US 11,831,532 B2
(45) Date of Patent: Nov. 28, 2023

(54) TIMESTAMP CORRECTION APPARATUS, TIME STAMP CORRECTION METHOD, AND PROGRAM

(71) Applicant: Nippon Telegraph and Telephone Corporation, Tokyo (JP)

(72) Inventors: Mizuto Nakamura, Musashino (JP); Toshihiko Seki, Musashino (JP); Naoyuki Tanji, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/791,803

(22) PCT Filed: Jan. 21, 2020

(86) PCT No.: PCT/JP2020/001876
§ 371 (c)(1),
(2) Date: Jul. 8, 2022

(87) PCT Pub. No.: WO2021/149138
PCT Pub. Date: Jul. 29, 2021

(65) Prior Publication Data
US 2023/0031208 A1  Feb. 2, 2023

(51) Int. Cl.
*H04L 43/106* (2022.01)
(52) U.S. Cl.
CPC .................................. *H04L 43/106* (2013.01)
(58) Field of Classification Search
CPC .................................................... H04L 43/106
See application file for complete search history.

(56) References Cited

U.S. PATENT DOCUMENTS

| | | | |
|---|---|---|---|
| 11,411,850 | B2 * | 8/2022 | Iwai .................... H04L 43/0888 |
| 2011/0085556 | A1 * | 4/2011 | Breslin .................... H04L 45/00 370/400 |
| 2013/0297820 | A1 * | 11/2013 | Chihara ............ H04W 56/0005 709/233 |

FOREIGN PATENT DOCUMENTS

| JP | 2018207152 | 12/2018 |
|---|---|---|
| WO | WO 2012104981 | 8/2012 |

OTHER PUBLICATIONS

Nakamura et al., "Study on multi-layer configuration management technique using traffic information," IEICE Technical Report, 2019, 118(420):9-14, 17 pages (with English Translation).

* cited by examiner

*Primary Examiner* — Aftab N. Khan
*Assistant Examiner* — Patrick F Ngankam
(74) *Attorney, Agent, or Firm* — Fish & Richardson P.C.

(57) ABSTRACT

A time stamp correction apparatus that corrects a deviation between time stamps of pieces of data acquired by physically connected NW apparatuses by correcting a deviation in a time stamp between pieces of traffic data is provided. The time stamp correction apparatus includes a waveform similarity computation unit that determines an IF pair based on a similarity between waveforms of time-series data of traffic observed in respective interfaces of the NW apparatuses, and a time stamp correction unit that generates correction information for correcting a deviation between the time stamps of the pieces of data based on feature points of time-series data of traffic observed in the IF pair.

12 Claims, 10 Drawing Sheets

TIMESTAMP CORRECTION APPARATUS, TIME STAMP CORRECTION METHOD, AND PROGRAM

CROSS-REFERENCE TO RELATED APPLICATIONS

This application is a National Stage application under 35 U.S.C. § 371 of International Application No. PCT/JP2020/001876, having an International Filing Date of Jan. 21, 2020. The disclosure of the prior application is considered part of the disclosure of this application, and is incorporated in its entirety into this application.

TECHNICAL FIELD

The present disclosure relates to a time stamp correction apparatus, a time stamp correction method, and a program.

BACKGROUND ART

Telecommunications carriers manage a huge number of network apparatuses to maintain and operate network services. When a failure occurs and operation management is performed, various data acquired from network apparatuses constituting a network is analyzed. In general, telecommunications carriers introduce different management systems depending on networks, layers, and vendors. At the time of data analysis, it is necessary to combine and analyze pieces of data acquired by a plurality of management systems.

CITATION LIST

Patent Literature

PTL 1: JP 2018-207152 A

SUMMARY OF THE INVENTION

Technical Problem

In a case where there is a deviation in a time stamp between pieces of data, correct data analysis cannot be performed. In a case where a failure has occurred in a network apparatus of a certain layer, analysis may be performed by combining data of network apparatuses of different layers or combining data of network apparatuses having different vendors. In this case, when the concept of data acquisition is different for each management system, there is a problem in that correct data analysis cannot be performed due to a deviation in a time stamp of performance information such as traffic data acquired by management systems and CPU usage rates of the network apparatuses. For example, in a case where a certain management system gives a time stamp of time A to data for a predetermined period of time to time A, and another management system gives a time stamp of time A to data for a predetermined period of time from time A, there is a deviation in terms of data between pieces of data that have been given the same time stamp acquired by the management systems.

A method of transmitting and receiving data including time information may be conceived as a method of ascertaining a deviation in a time stamp. However, in a case where there is a network apparatus, such as an optical transport apparatus, which can count a traffic flow rate but cannot view the contents of data, it is difficult to ascertain a deviation in a time stamp from the network apparatus.

The present disclosure is contrived in view of the above-described circumstances, and an object thereof is to correct a deviation in a time stamp between pieces of data acquired by network apparatuses.

Means for Solving the Problem

A time stamp correction apparatus according to an aspect of the present disclosure is a time stamp correction apparatus that corrects a deviation between time stamps of pieces of data acquired by physically connected network apparatuses, the time stamp correction apparatus including a similarity determination unit configured to determine a set of interfaces, based on a similarity between waveforms of time-series data of traffic observed in the interfaces of the network apparatuses, and a time stamp correction unit configured to generate correction information for correcting the deviation between time stamps of pieces of data, based on feature points of time-series data of traffic observed in the set of the interfaces.

Effects of the Invention

According to the present disclosure, it is possible to correct a deviation in a time stamp between pieces of data acquired by network apparatuses.

DESCRIPTION OF EMBODIMENTS

An embodiment of the present disclosure will be described below with reference to the drawings.

Figure 1:
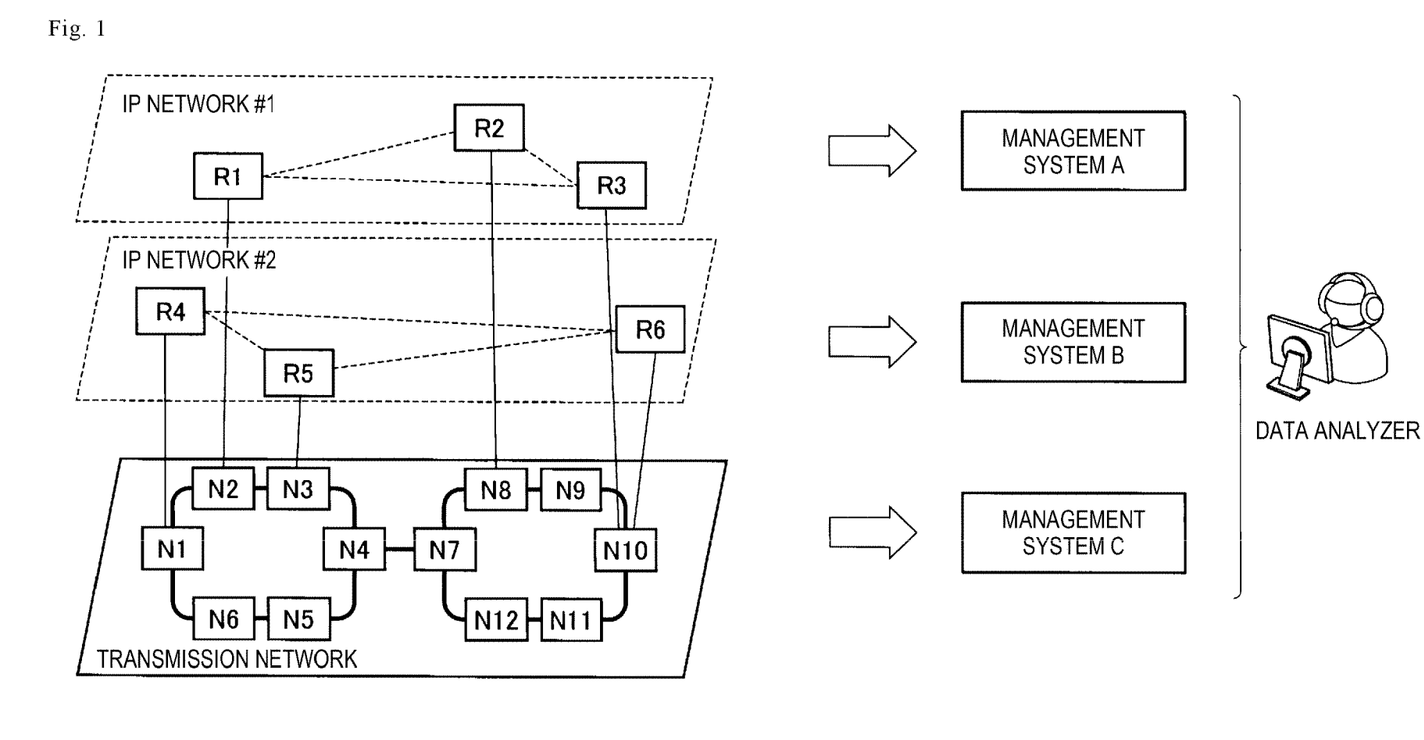
FIG. 1 is a diagram illustrating an example of a network configuration of a telecommunications carrier.

Referring to FIG. 1, an example of a network configuration of a telecommunications carrier using a time stamp correction apparatus of the present embodiment will be described. A network in FIG. 1 is constituted by IP networks #1 and #2 that allocate IP addresses to network apparatuses and relay packets and a transmission network that performs mass communication using light-speed transmission technology. The IP network #1 is constituted by network apparatuses R1 to R3. The IP network #2 is constituted by network apparatuses R4 to R6. The transmission network is constituted by network apparatuses N1 to N12. The IP networks #1 and #2 are IP layers, and a transmission network is a transmission layer. Note that networks of layers other than the IP layers and transmission layer illustrated in the drawing may be included. Each of the network apparatuses R1 to R6 of the IP networks #1 and #2 is physically connected to the network apparatuses N1 to N12 of the transmission network. Traffic flowing between the network apparatuses of the IP networks #1 and #2 is relayed through the transmission network. For example, traffic flowing between the network apparatuses R1 and R3 flows through the network apparatuses N2, N3, N4, N7, N12, N11, and N10 of the transmission network.

The IP network #1 is managed by a management system A, the IP network #2 is managed by a management system B, and the transmission network is managed by a management system C. In data analysis in which pieces of data acquired by the management systems A to C are combined, there is a possibility that a deviation in a time stamp will occur in a case where the concept of data acquisition is different for each of the management systems A to C. For example, for data acquired at intervals of 5 minutes of a traffic amount given a time stamp of 10:00, in a case where a traffic amount from 9:55:01 to 10:00:00 is acquired in the management system A, a traffic amount from 10:00:00 to 10:04:59 is acquired in the management system B, and a traffic amount from 9:57:31 to 10:02:29 is acquired in the management system C, the time stamps of each piece of data appear as 10:00 all alike, but a deviation occurs in terms of data. For example, in FIG. 1, IFs of the network apparatus R1 of the IP network #1 and IFs of the network apparatus N2 of the transmission network are physically connected to each other, and traffic transmitted from the network apparatus R1 is input to the network apparatus N2 substantially without delay. A traffic amount of the network apparatus R1 is acquired by the management system A, and a traffic amount of the network apparatus N2 is acquired by the management system C. When the management system A and the management system C differ in a manner in which a time stamp is given as described above, a deviation occurs between time stamps of pieces of data acquired from the network apparatus R1 and the network apparatus N2.

The time stamp correction apparatus of the present embodiment determines a set of IFs physically connected between network apparatuses (hereinafter, referred to as an IF pair) and then outputs correction information for correcting a deviation in a time stamp of the IF pair. A data analyzer can perform correct data analysis by correcting the time stamps of the pieces of data acquired from the management systems A to C based on this correction information. The data with time stamps to be corrected may be performance information, such as traffic data and a CPU usage rate, which can be acquired by an SNMB. Furthermore, the present embodiment relates to a technique in which time stamps of other performance information may also be corrected by ascertaining a deviation in a time stamp of traffic data.

A time stamp correction apparatus 1 of the present embodiment will be described with reference to FIG. 2.

Figure 2:
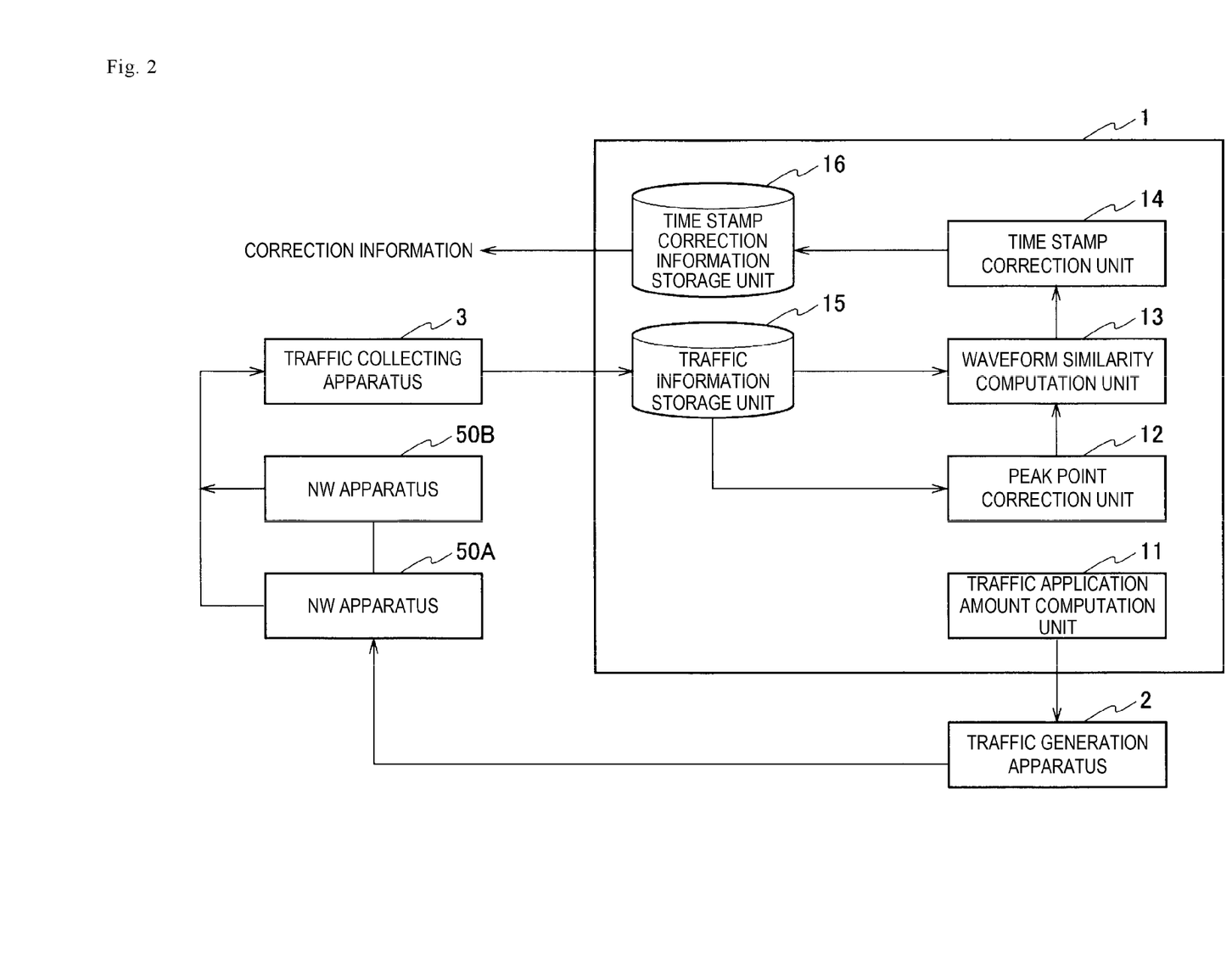
FIG. 2 is a diagram illustrating an example of a configuration of a time stamp correction apparatus.

The time stamp correction apparatus 1 illustrated in FIG. 2 includes a traffic application amount computation unit 11, a peak point correction unit 12, a waveform similarity computation unit 13, a time stamp correction unit 14, a traffic information storage unit 15, and a time stamp correction information storage unit 16.

The traffic application amount computation unit 11 determines an application amount, an application time, and an application interval of traffic so that a feature amount varying depending on a change in a traffic amount with time appears for each IF pair, and notifies a traffic generation apparatus 2 of the determined application information. The application amount is, for example, the size of a test packet to be applied.

The traffic generation apparatus 2 generates a test packet based on the application information and transmits the test packet from each IF of a network (NW) apparatus 50A to a NW apparatus 50B. The NW apparatuses 50A and 50B are physically connected to each other. The NW apparatuses 50A and, 50B may be apparatuses that operate in different layers. For example, the NW apparatus 50A is the network apparatus R1 of the IP network #1 in FIG. 1, and the NW apparatus 50B is the network apparatus N2 of the transmission network.

The traffic generation apparatus 2 may have functions of the traffic application amount computation unit 11, and the time stamp correction apparatus 1 may have functions of the traffic generation apparatus 2.

A traffic collecting apparatus 3 collects time-series data of traffic (for example, data of change over time of traffic amount) in the IFs of the NW apparatuses 50A and 50B at predetermined sampling intervals. The traffic collecting apparatus 3 acquires time-series data of traffic of the NW apparatuses 50A and 50B from the management systems that respectively manage the NW apparatuses 50A and 50B. For example, in a case where the NW apparatus 50A is the network apparatus R1 of FIG. 1 and the NW apparatus 50B is the network apparatus N2, the traffic collecting apparatus 3 acquires time-series data of the network apparatus R1 from the management system A and acquires time-series data of the network apparatus N2 from the management system C.

The peak point correction unit 12 merges sample points in a case where the number of sample points is greater than an application time+an application interval. When there is a deviation in an IF to which traffic is applied at the same timing as a sampling interval, and the applied traffic is divided into a plurality of sample points, there is a possibility that clustering based on a similarity between waveforms of time-series data may not be able to be performed, and there is a possibility that it may be difficult to distinguish the IF from an IF to which traffic will be applied next. The peak point correction unit 12 can improve the accuracy of determination of an IF pair according to clustering based on a similarity between waveforms of time-series data and an appearance timing of a feature point by combining a plurality of feature points appearing in the time-series data of traffic into one feature point.

The waveform similarity computation unit 13 analyzes a similarity between waveforms of time-series data of traffic observed in the IFs of the NW apparatuses 50A and 50B and determines IFs having a high similarity as an IF pair.

The time stamp correction unit 14 generates time stamp correction information for matching time stamps of pieces of data acquired by the NW apparatuses 50A and 50B based on feature points of time-series data of traffic observed in IFs of an IF pair.

The traffic information storage unit 15 stores time-series data of traffic which is acquired by the traffic collecting apparatus 3.

The time stamp correction information storage unit 16 stores correction information of a time stamp which is generated by the time stamp correction unit 14, and outputs the correction information in response to a request.

Figure 3:
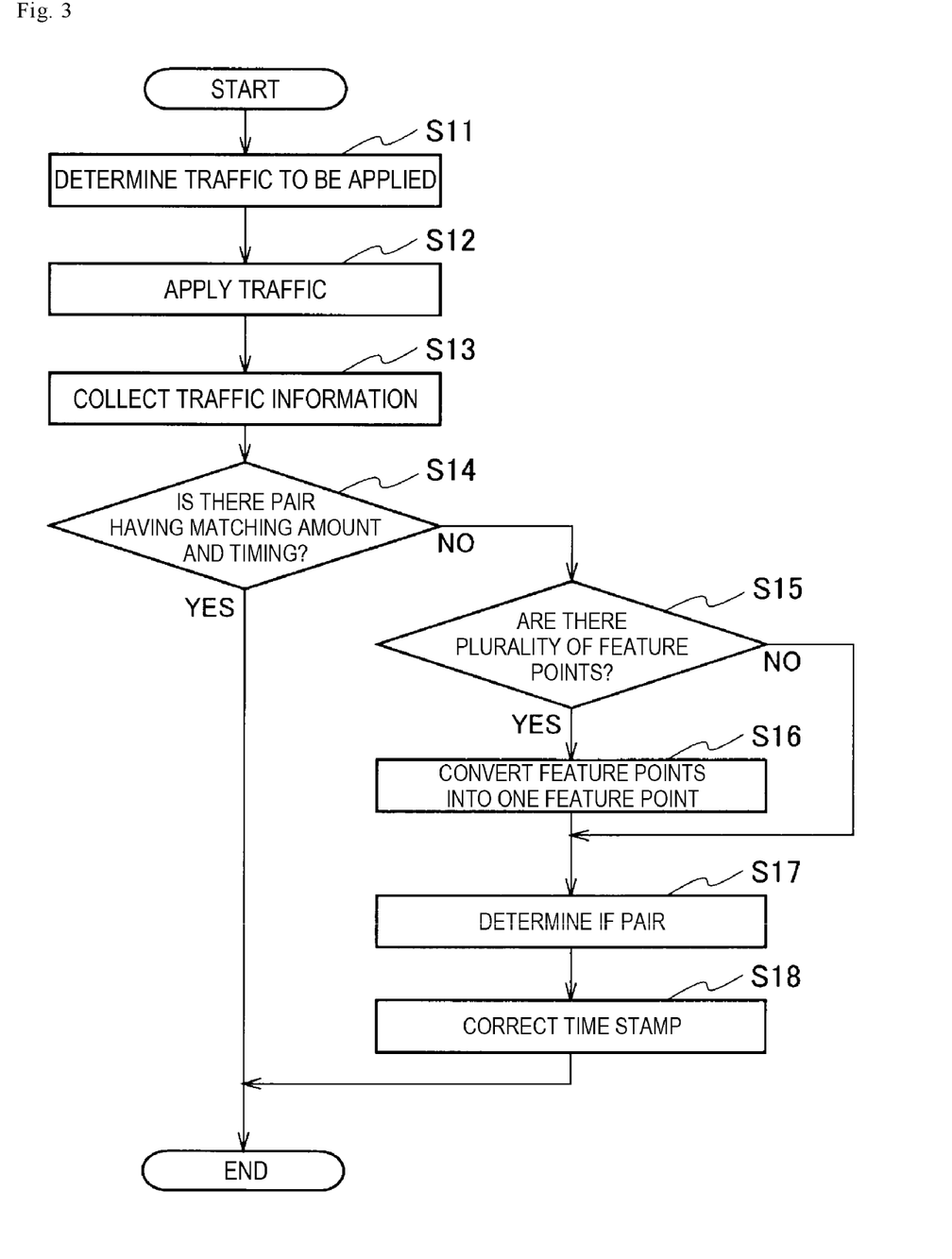
FIG. 3 is a flowchart illustrating a flow of processing of the time stamp correction apparatus.

The operation of the time stamp correction apparatus 1 will be described with reference to a flowchart of FIG. 3.

Figure 4:
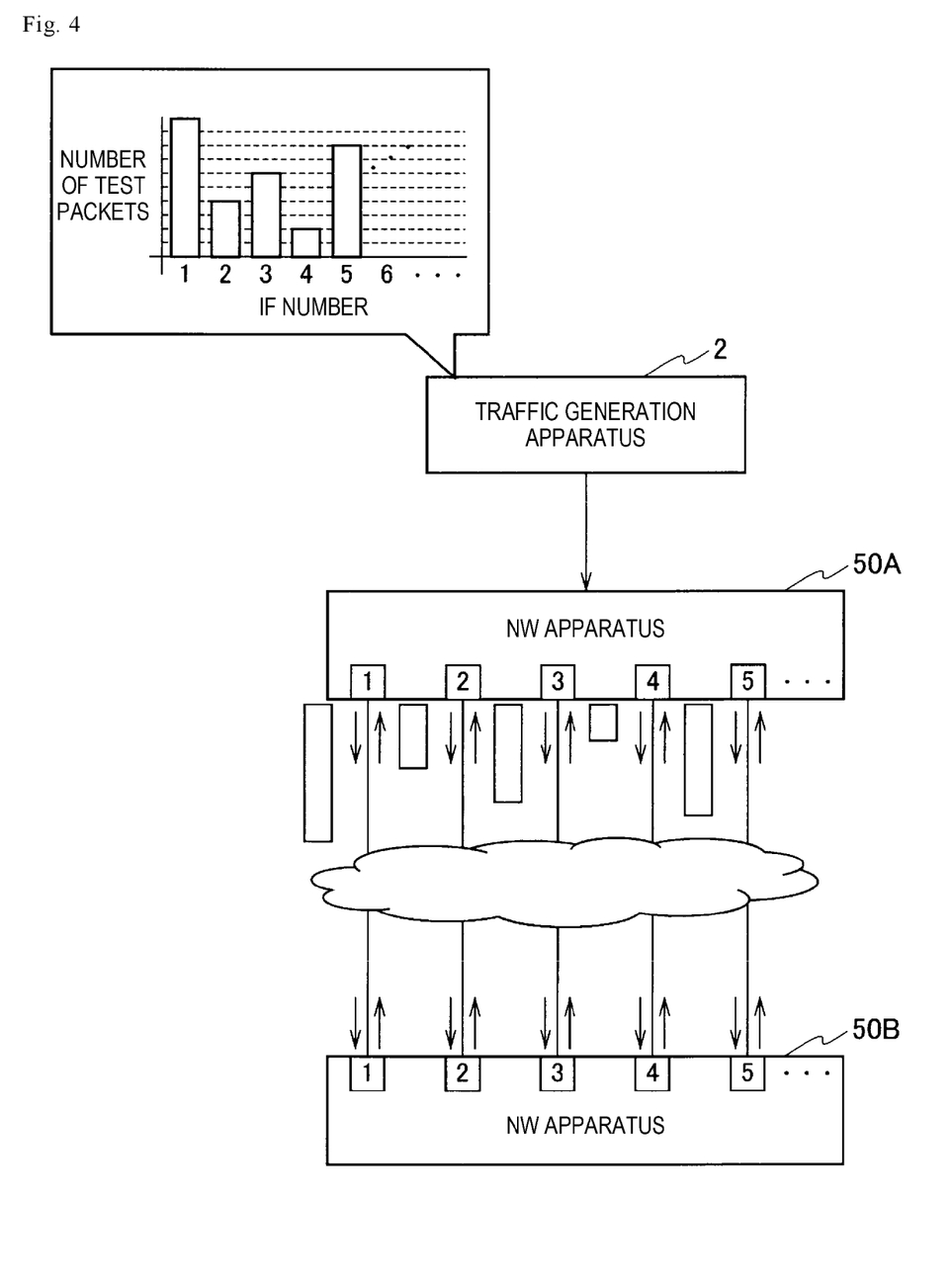
FIG. 4 is a diagram illustrating an example of traffic to be applied between network apparatuses.

In step S11, the traffic application amount computation unit 11 determines an application amount, an application time, and an application interval of traffic. The traffic application amount computation unit 11 may obtain an application amount of traffic to each IF so that the application amount of traffic which is different for each of the IFs of the NW apparatus 50A is transmitted. The traffic application amount computation unit 11 determines an application time and an application interval so that a time obtained by adding up the application time and the application interval is longer than a sampling interval of data, based on the number of IFs and the sampling interval. The timing at which traffic is applied may be different for each IF. For example, the traffic application amount computation unit 11 determines the number of test packets to be transmitted so that a difference between adjacent IFs is increased as illustrated in FIG. 4, and determines an application timing so that a test packet is transmitted by shifting a timing in ascending order of an IF number. Note that, in a case where a sufficient difference is given to the application amount of traffic to be applied to each IF, traffic may be applied to all of the IFs at the same time, or traffic may be applied to each of groups by dividing the IFs into several groups.

In step S12, the traffic generation apparatus 2 transmits a test packet from each of the IFs in the NW apparatus 50A based on the application information determined by the traffic application amount computation unit 11. For example, login from the traffic generation apparatus 2 to the NW apparatus 50A is performed, and a test packet is transmitted from the IF of the NW apparatus 50A to the IF of the NW apparatus 50B. Alternatively, a test packet is transmitted from the traffic generation apparatus 2 to the IF of the NW apparatus 50B through the NW apparatus 50A.

Note that, in a case where a feature amount different for each IF pair appears without applying traffic, the processes of steps S11 and S12 are unnecessary. For example, traffic different for each region flows to an IF of a network apparatus through which Internet traffic flows, and thus an IF pair may be determined from the similarity between waveforms without giving features by applying traffic.

In step S13, the traffic collecting apparatus 3 collects time-series data of traffic flowing through the IFs of the NW apparatuses 50A and 50B.

In step S14, the waveform similarity computation unit 13 determines whether there is an IF of the NW apparatus 50B of which a traffic amount and a timing match those of a target IF of the NW apparatus 50A. For example, the waveform similarity computation unit 13 compares a traffic amount and a time stamp of data of a feature point of time-series data of the target IF of the NW apparatus 50A with a traffic amount and a time stamp of each of feature points of time-series data of the IFs of the NW apparatus 50B, and determines whether there is time-series data having a matching traffic amount and time stamp. In a case where there is time-series data having a matching traffic amount and time stamp, a target IF and an IF of time-series data become an IF pair, and since there is no deviation in a time stamp, the processing is terminated.

Figure 5:
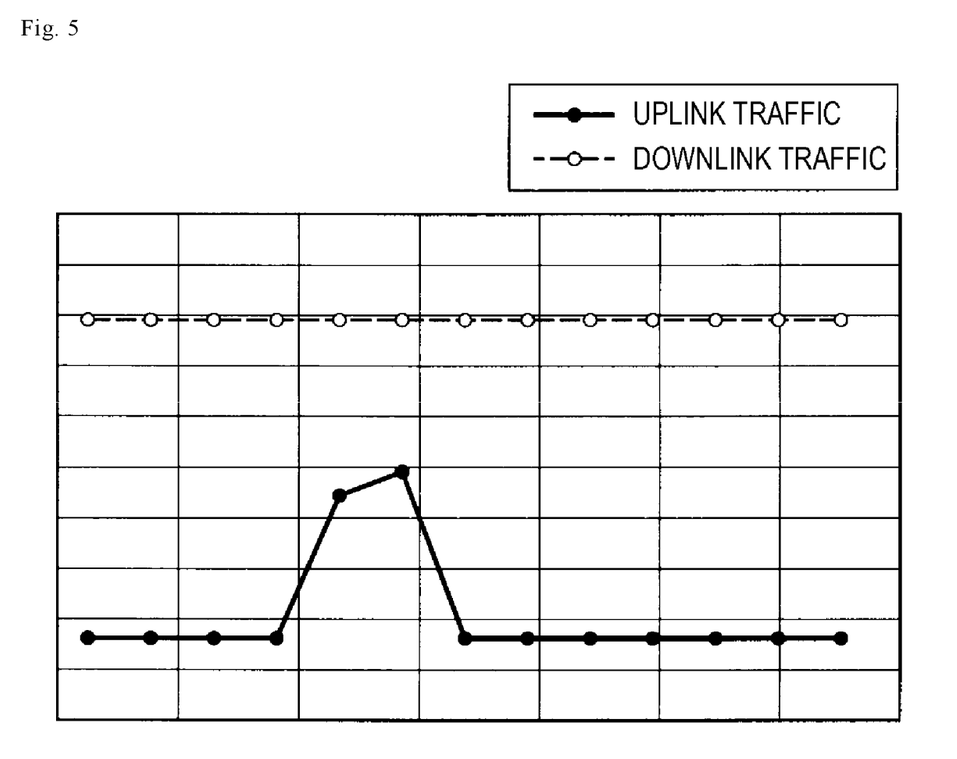
FIG. 5 is a diagram illustrating an example in which a feature point is divided into a plurality of sample points.

In step S15, the peak point correction unit 12 determines whether the number of sample points is greater than an application time+an application interval in the time-series data collected by the traffic collecting apparatus 3. When the traffic generation apparatus 2 applies traffic, there is a possibility that a feature amount will be divided into a plurality of adjacent sample points as illustrated in FIG. 5, without completing the application of traffic within one sampling interval. In the example of FIG. 5, a horizontal axis represents a time, and a vertical axis represents a traffic amount.

Figure 6:
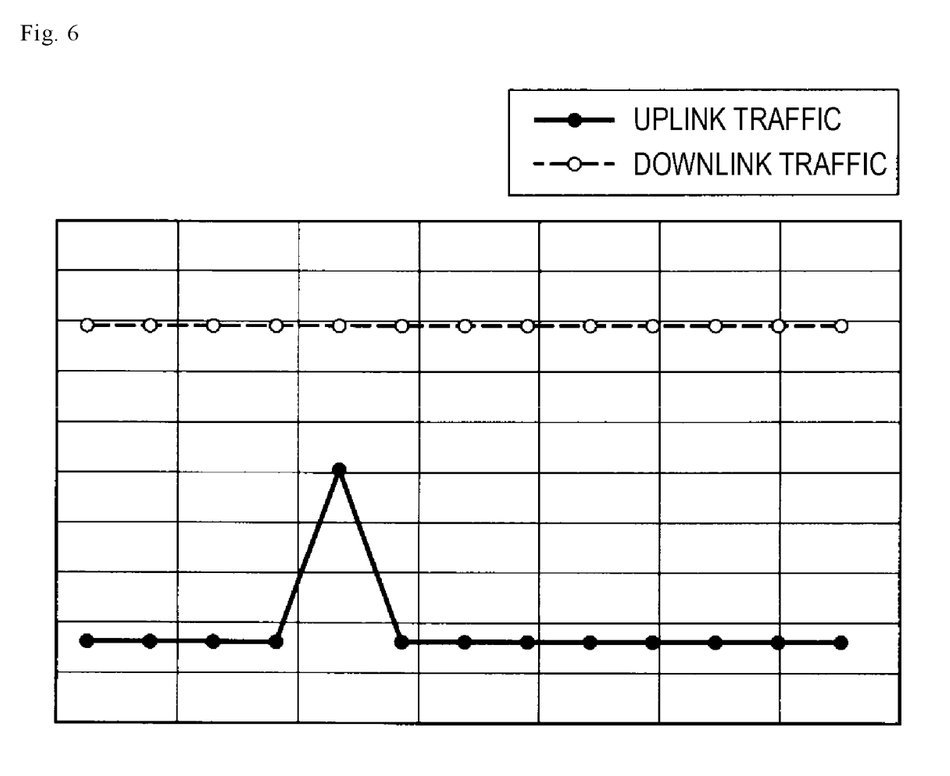
FIG. 6 is a diagram illustrating an example in which a plurality of feature points are converted into one feature point.

In a case where there are a plurality of feature points, the peak point correction unit 12 adds feature amounts to convert the feature points into one feature point in accordance with a rising time of the feature point in step S16. Specifically, the peak point correction unit 12 obtains a traffic amount at the rising time of the feature point using a value obtained by subtracting an average traffic amount excluding the feature point portion from the sum of the plurality of feature points, that is, the sum of feature amounts—(average traffic amount×the number of feature points), and interpolates a traffic amount of other feature points with the average traffic amount. As illustrated in FIG. 6, the plurality of feature points in FIG. 5 are converted into one feature point at a rising timing of the feature point in FIG. 5. In steps S17 and S18 to be described below, processing is performed using time-series data in which feature points are combined into one feature point.

Figure 7:
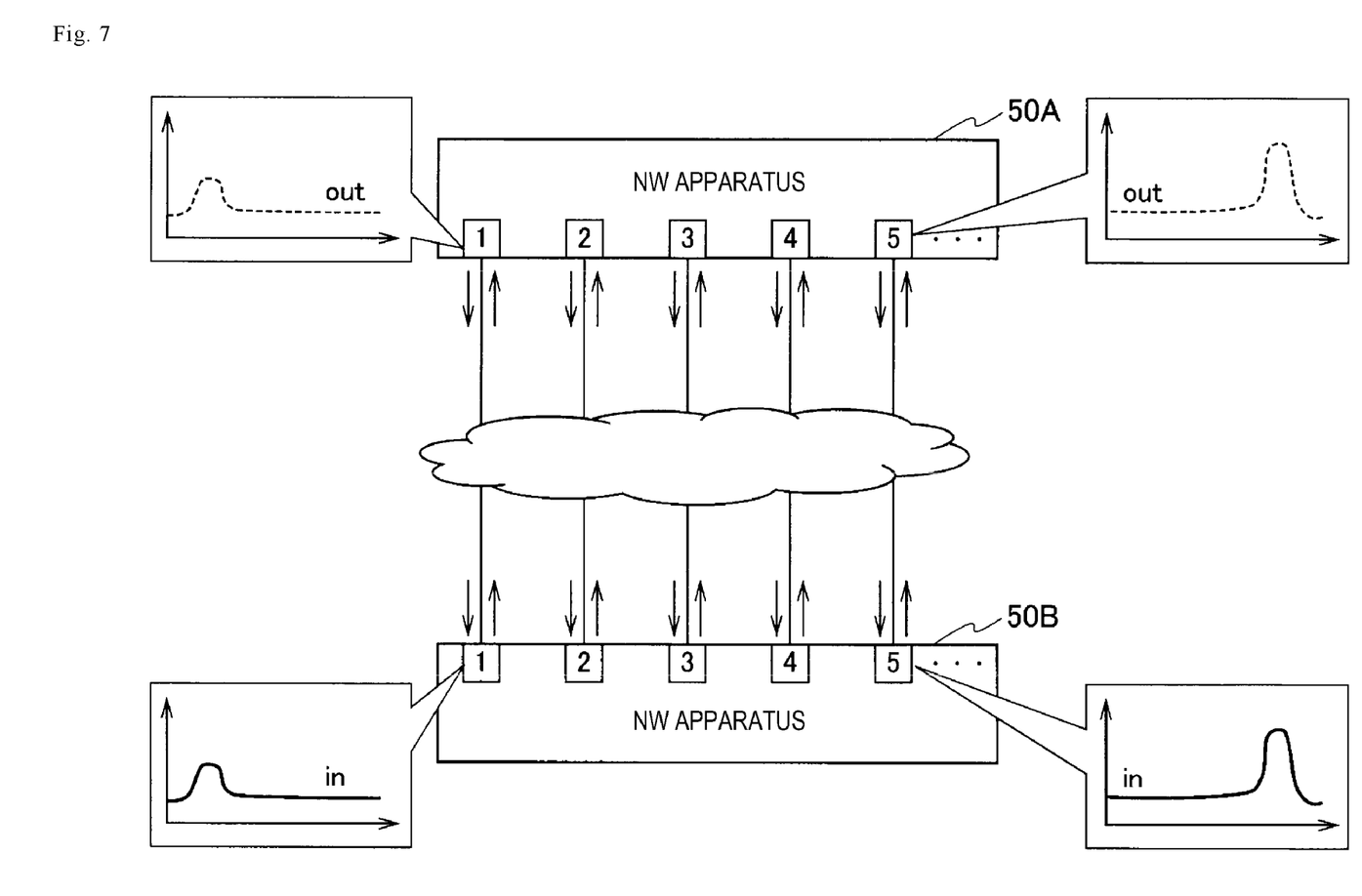
FIG. 7 is a diagram illustrating determination of an IF pair based on a similarity between waveforms.

In step S17, the waveform similarity computation unit 13 determines an IF pair based on a similarity between waveforms of time-series data acquired from the IFS of the NW apparatuses 50A and 50B. As illustrated in FIG. 7, a combination of the IFs of the NW apparatus 50B to which traffic similar to the traffic given unique features transmitted from the IFs of the NW apparatus 50A is input is determined to be an IF pair.

Figure 8:
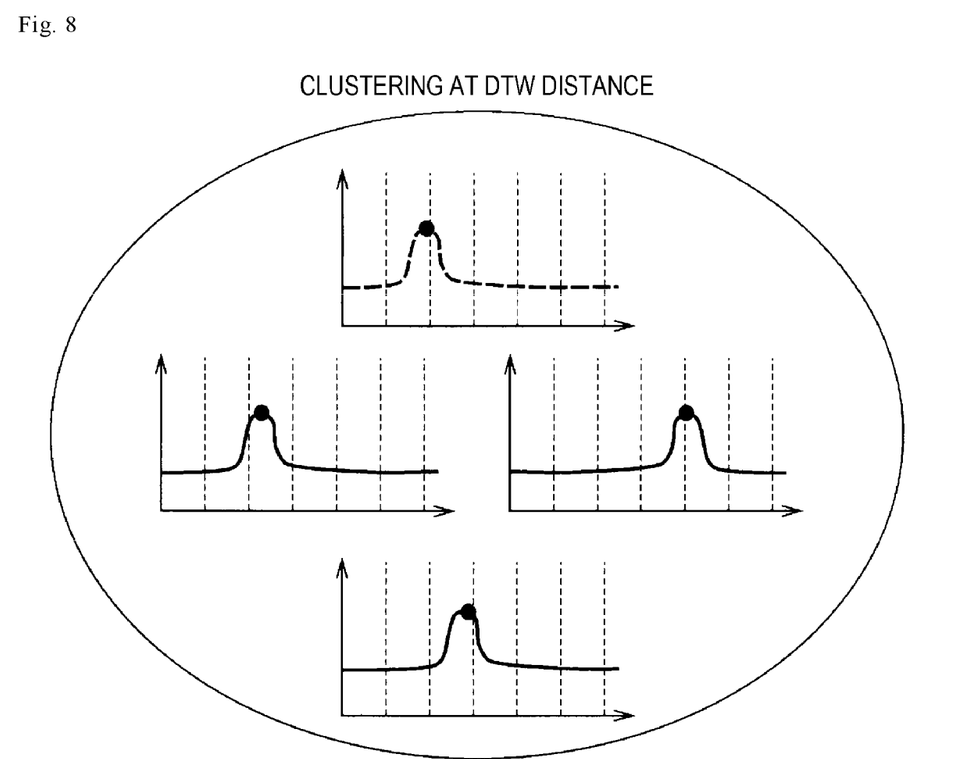
FIG. 8 is a diagram illustrating an example in which time-series data observed in an IF is clustered.

Specifically, the waveform similarity computation unit 13 calculates a distance by applying dynamic time warping (DTW) to time-series data of traffic transmitted from a target IF of the NW apparatus 50A and time-series data of traffic which is input to each of the IFs of the NW apparatus 50B. As illustrated in FIG. 8, the waveform similarity computation unit 13 clusters time-series data in which the calculated DTW distance is short, and determines IFs of time-series data having the smallest time difference between feature points in the cluster to be an IF pair.

DTW is a technique for comparing a distance between values of two pieces of time-series data at respective points in time with a round robin algorithm to find a relationship in which the value of a distance between the pieces of time-series data is the smallest. DTW can be calculated even when a data length of time-series data is not aligned. In DTW, a similarity increases as long as shapes are similar to each other even when a time axis (phase) of time-series data is shifted.

Figure 9:
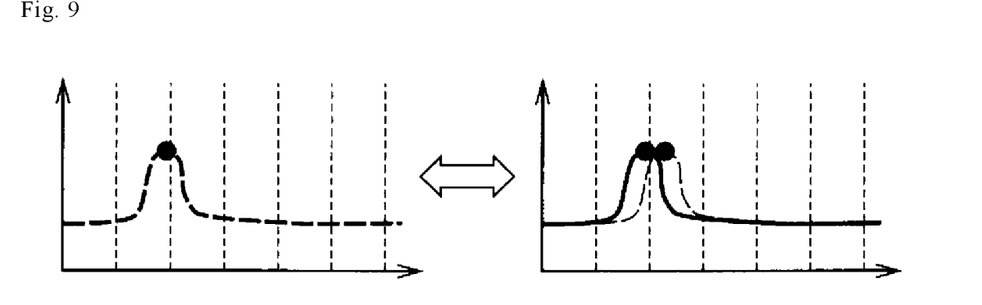
FIG. 9 is a diagram illustrating a state where a time stamp of time-series data of an IF pair is corrected.

In step S18, the time stamp correction unit 14 generates correction information for correcting a time stamp of an IF pair and stores the correction information in the time stamp correction information storage unit 16. Specifically, the time stamp correction unit 14 corrects a time stamp of any one piece of time-series data so that feature points of pieces of time-series data of IF pairs are set to be at the same timing as illustrated in FIG. 9. Reference time-series data is determined in advance. For example, the time stamp correction unit 14 determines that a time stamp of time-series data acquired by the management system A is set to be as a reference, and generates correction information for matching other time-series data to the reference time stamp of the time-series data.

Note that the processes of steps S14 to S18 may be performed on each IF of the NW apparatus 50A.

As described above, the time stamp correction apparatus 1 of the present embodiment includes the waveform similarity computation unit 13 that determines an IF pair based on a similarity between waveforms of time-series data of traffic observed in the IFs of the NW apparatuses 50A and 50B, and the time stamp correction unit 14 that generates correction information for correcting a deviation between time stamps of pieces of traffic data based on feature points of time-series data of traffic observed in the IFs of the IF pair. Thereby, even when the concept of data acquisition is different for each of the management systems A to C, it is possible to specify an IF pair between the NW apparatuses 50A and 50B and obtain correction information for correcting a time stamp of pieces of data acquired from the NW apparatuses 50A and 50B, and thus correct data analysis can be performed.

Figure 10:
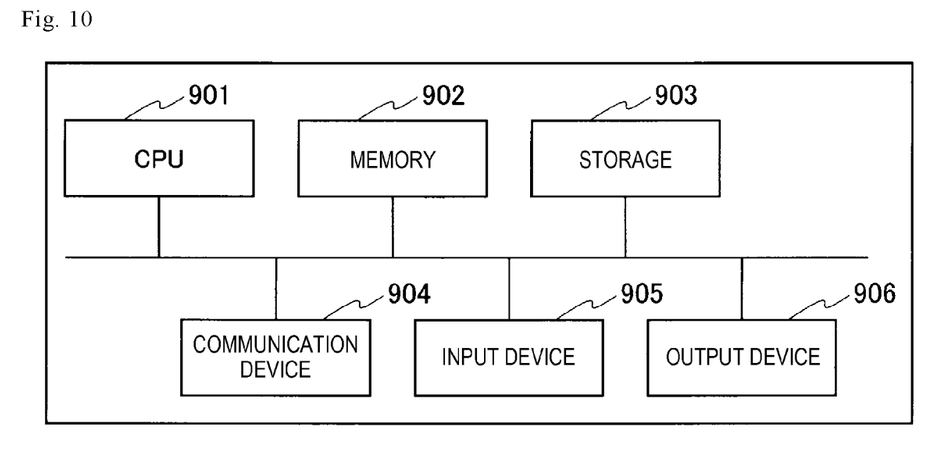
FIG. 10 is a diagram illustrating an example of a hardware configuration of a time stamp correction apparatus.

As the time stamp correction apparatus 1 described above, for example, a general-purpose computer system including a central processing unit (CPU) 901, a memory 902, a storage 903, a communication device 904, an input device 905, and an output device 906 as illustrated in FIG. 10 can be used. In the computer system, the time stamp correction apparatus 1 is realized by the CPU 901 executing a predetermined program loaded on the memory 902. The program can also be recorded on a computer readable recording medium such as a magnetic disk, an optical disc, or a semiconductor memory or can also be distributed through a network.

REFERENCE SIGNS LIST

1 Time stamp correction apparatus
11 traffic application amount computation unit
12 peak point correction unit
13 waveform similarity computation unit
14 time stamp correction unit
15 traffic information storage unit
16 time stamp correction information storage unit
2 Traffic generation apparatus
3 traffic collecting apparatus

The invention claimed is:

1. A time stamp correction apparatus that corrects a deviation between time stamps of pieces of data acquired by physically connected network apparatuses, the time stamp correction apparatus comprising one or more processors configured to:
    receive first time-series data of traffic in a first network apparatuses, and second time-series data of traffic in a second network apparatuses, wherein the first network apparatus and the second network apparatus are in different layers;
    determine a similarity between a first waveform of the first time-series data and a second waveform of the second time-series data;
    determine, based on the similarity, a pair of interfaces are physically connected between the first network apparatus and the second network apparatus, wherein traffic is transmitted from the first network apparatus to the second network apparatus through the pair of interfaces; and
    in response to determining that the pair of interfaces are physically connected between the first network apparatus and the second network apparatus, correct the deviation between first time stamps of the first time-series data and second time stamps of the second time-series data, wherein correcting the deviation includes setting the first time stamps and the second time stamps as a same value.

2. The time stamp correction apparatus according to claim 1, wherein the time stamp correction apparatus is configured to:
    cluster waveforms of time-series data of traffic of multiple network apparatuses with respect to similarity, the waveforms including the first waveform of the first time-series data and the second waveform of the second time-series data;
    determine that a time difference between first feature points included in the first waveform of the first time-series data and second feature points included in the second waveform is the smallest in the cluster; and
    determine that the pair of the interfaces are physically connected between the first network apparatus and the second network apparatus.

3. The time stamp correction apparatus according to claim 1, wherein traffic in which a feature amount different for each pair of physically connected interfaces is applied between the network apparatuses, and
    the time stamp correction apparatus is further configured to combine a plurality of feature points into one feature point in a case where the time-series data of the traffic includes the plurality of feature points.

4. The time stamp correction apparatus according to claim 1,
    wherein each of the network apparatuses operate in a different layer.

5. A time stamp correction apparatus that corrects a deviation between time stamps of pieces of data acquired by physically connected network apparatuses, the time stamp correction method at a computer comprising:
    receiving first time-series data of traffic in a first network apparatuses, and second time-series data of traffic in a second network apparatuses, wherein the first network apparatus and the second network apparatus are in different layers;
    determining a similarity between a first waveform of the first time-series data and a second waveform of the second time-series data;
    determining, based on the similarity, a pair of interfaces are physically connected between the first network apparatus and the second network apparatus, wherein traffic is transmitted from the first network apparatus to the second network apparatus through the pair of interfaces; and
    in response to determining that the pair of interfaces are physically connected between the first network apparatus and the second network apparatus, correcting the deviation between first time stamps of the first time-series data and second time stamps of the second time-series data, wherein correcting the deviation includes setting the first time stamps and the second time stamps as a same value.

6. A non-transitory computer readable medium storing one or more instructions causing a computer to operate as a time stamp correction apparatus that corrects a deviation between time stamps of pieces of data acquired by physically connected network apparatuses and to execute:
    receiving first time-series data of traffic in a first network apparatuses, and second time-series data of traffic in a second network apparatuses, wherein the first network apparatus and the second network apparatus are in different layers;
    determining a similarity between a first waveform of the first time-series data and a second waveform of the second time-series data;
    determining, based on the similarity, a pair of interfaces are physically connected between the first network apparatus and the second network apparatus, wherein traffic is transmitted from the first network apparatus to the second network apparatus through the pair of interfaces; and in response to determining that the pair of interfaces are physically connected between the first network apparatus and the second network apparatus, correcting the deviation between first time stamps of the first time-series data and second time stamps of the second time-series data, wherein correcting the deviation includes setting the first time stamps and the second time stamps as a same value.

7. The time stamp correction method according to claim 5, comprising
clustering waveforms of time-series data of traffic of multiple network apparatuses with respect to similarity, the waveforms including the first waveform of the first time-series data and the second waveform of the second time-series data;
determining that a time difference between first feature points included in the first waveform of the first time-series data and second feature points included in the second waveform is the smallest in the cluster; and
determining that the pair of the interfaces are physically connected between the first network apparatus and the second network apparatus.

8. The time stamp correction method according to claim 5, wherein traffic in which a feature amount different for each pair of physically connected interfaces is applied between the network apparatuses, and
the method further comprises: combining a plurality of feature points into one feature point in a case where the time-series data of the traffic includes the plurality of feature points.

9. The time stamp correction method according to claim 5,
wherein each of the network apparatuses operate in a different layer.

10. The non-transitory computer readable medium according to claim 6, wherein the one or more instructions further cause the computer to execute:
clustering waveforms of time-series data of traffic of multiple network apparatuses with respect to similarity, the waveforms including the first waveform of the first time-series data and the second waveform of the second time-series data;
determining that a time difference between first feature points included in the first waveform of the first time-series data and second feature points included in the second waveform is the smallest in the cluster; and
determining that the pair of the interfaces are physically connected between the first network apparatus and the second network apparatus.

11. The non-transitory computer readable medium according to claim 6, wherein traffic in which a feature amount different for each pair of physically connected interfaces is applied between the network apparatuses, and
the one or more instructions further cause the computer to execute: combining a plurality of feature points into one feature point in a case where the time-series data of the traffic includes the plurality of feature points.

12. The non-transitory computer readable medium according to claim 6,
wherein each of the network apparatuses operate in a different layer.

* * * * *